United States Patent [19]

Lucas et al.

[11] Patent Number: 5,266,607
[45] Date of Patent: Nov. 30, 1993

[54] CRYSTALLIZATION ENHANCEMENT OF POLYOLEFINS

[75] Inventors: Bennie M. Lucas; V. Krishnamurthy, both of Odessa, Tex.

[73] Assignee: Rexene Products Company, Dallas, Tex.

[21] Appl. No.: 714,602

[22] Filed: Jun. 13, 1991

Related U.S. Application Data

[63] Continuation-in-part of Ser. No. 443,174, Nov. 30, 1989, abandoned.

[51] Int. Cl.$^5$ .................. C08J 3/28; C08K 5/13; C08L 23/30
[52] U.S. Cl. .................. 522/76; 522/78; 522/79; 522/126; 522/127; 522/129; 522/130; 522/157; 522/161; 525/240
[58] Field of Search ............ 522/157, 161, 76, 78, 522/79; 525/240

[56] References Cited

U.S. PATENT DOCUMENTS

| | | | |
|---|---|---|---|
| 3,349,018 | 10/1967 | Potts | 204/159.2 |
| 4,282,076 | 8/1981 | Boynton | 522/157 |
| 4,628,073 | 12/1986 | Fisher | 522/149 |
| 4,727,113 | 2/1988 | Kohyama | 522/157 |

FOREIGN PATENT DOCUMENTS 190889  8/1986 European Pat. Off.
3415063 11/1985 Fed. Rep. of Germany.

OTHER PUBLICATIONS

Translation of Kirch (DE063).
Encyclopedia of Polymer Science, vol. 4, pp. 418–449.

*Primary Examiner*—Marion E. McCamish
*Assistant Examiner*—Arthur H. Koeckert
*Attorney, Agent, or Firm*—Harold E. Meier

[57] ABSTRACT

Polymer compositions having a first and second portion selected from polypropylenes, polyethylenes, propylene-ethylene copolymers and mixtures thereof having enhanced crystallization properties and a method for producing the same are disclosed. Antioxidant is mixed with the first portion, 0.01 to 1.25 wt %, of the composition which is then irradiated to a dosage of 5–30 Mrads of ionizing radiation in air to induce cross linking. The irradiated first portion is then blended with the non-irradiated second portion. The cross-linked polymer is believed to provide nucleation sites for the initiation of crystallization, thereby enhancing crystallization of the polymer as evidenced by elevated DSC freeze points. Crystallization of the polyolefin is enhanced without any detrimental effects on hexane or xylene extractability of the polymer and without degrading the composition to any appreciable extent.

10 Claims, No Drawings

CRYSTALLIZATION ENHANCEMENT OF POLYOLEFINS

RELATED APPLICATION

This application is a continuation-in-part of application Ser. No. 07/433,174, filed Nov. 30, 1989 now abandoned.

TECHNICAL FIELD

This invention relates to polyolefins such as polypropylene, polyethylene, propylene-ethylene copolymers and mixtures thereof with enhanced crystallization properties and a method for manufacturing such polymers.

BACKGROUND OF THE INVENTION

The rate and temperature at which a polyolefin such as polypropylene, polyethylene, propylene-ethylene copolymers or mixtures thereof crystallize is an important parameter, especially with respect to melt processes such as injection molding or blow molding, where the polymer is melted and then shaped into its final form. The rate at which a polymer crystallizes determines the efficiency of the process by controlling the total time required for each cycle or the rate at which the process may be operated. For example, in conventional injection molding processes, the rate at which the process can be operated is determined, to a large degree, by the amount of time required for the polymers to crystallize or "freeze" after being molded. Thus, the speed at which a melt process can be operated may be increased by enhancing the rate at which the polymer used in the process crystallizes. In addition, enhanced crystallization typically results in improved clarity and increased stiffness.

"Polyolefin," as used herein, means thermoplastic polymers derived from simple olefins, copolymers derived from olefins and blends of such polymers and copolymers. The term "polymer," as used herein, refers generically to homopolymers and to copolymers derived from two or more monomers.

In the past, enhancement of crystallization in polymers such as polypropylene, polyethylene, propylene-ethylene copolymers and mixtures thereof has been achieved by adding an extrinsic substance which acts as a seed or nuclei on which crystal growth can be initiated. Such substances are commonly referred to as nucleation agents and may consist of inorganic substances such as talc and other silicates, precipitated or ground calcium carbonates, sodium phosphates and stearates. Organic nucleating agents include dibenzylidene sorbitols and sodium benzoate. During the melt process, these substances either do not melt at all, or melt but solidify before the polymer, thus acting as nuclei for the initiation of crystallization.

The use of conventional nucleating agents has several disadvantages. First, the efficiency of the agent depends upon its particle size and the degree of dispersion and distribution of the agent in the polymer. Inorganic nucleating agents must have an extremely small particle size and be uniformly dispersed and distributed throughout the polymer to be efficient. Moreover, the addition of any foreign substance to the polymer can affect the physical and chemical properties, such as toxicity and extractability, of any product made from the polymer. This is especially critical in the case where the polymer is used to make a product that will come in contact with food or medical product.

Thus there is a need for a practical and readily achievable method of optimally enhancing the crystallization of polymers, such as polypropylene, polyethylene, propylene-ethylene copolymers, and mixtures of the same. It is also desirable to enhance the crystallization of these materials without degrading the polymer or copolymer to any appreciable extent. Preferably, crystallization enhancement is achieved by treating or using a relatively small amount of material to facilitate processing of the polymer.

Boynton, U.S. Pat. No. 4,282,076 discloses a method of visbreaking polypropylene wherein a prodegradant is formed by activating a first portion of a polypropylene polymer, mixing the prodegradant with a second portion of propylene polymer which may contain a stabilizing amount of at least one antioxidant, wherein the second portion is at least equal in amount to the prodegradant, adding to the mixture of the prodegradant and second portion of the propylene polymer a stabilizing amount of at least one antioxidant if the second portion does not already contain a stabilizing amount of such a stabilizer, and heating the mixture to an extrusion temperature to controllably lower the molecular weight of the mixture, while substantially retaining the stabilizing effect of the antioxidant stabilizer or stabilizers. The prodegradant is produced by activating a portion of the polypropylene polymer by exposure to ionizing radiation or air oxidation. After heating to extrusion temperatures, the mixture of the first activated propylene polymer and second portion of propylene polymer is purported to be significantly reduced in molecular weight and the molecular weight distribution is narrowed.

Kohyama et al., U.S. Pat. No. 4,727,113, discloses a crystalline 1-butene comprising: (a) a crystalline 1-butene polymer containing a 1-butene component as a main component, and (b) a radical-treated crystalline olefinic polymer having (1) a boiling p-xylene insoluble content of 30% by weight at most and (2) the difference between the crystallization temperature of the radical-treated crystalline olefinic polymer and the crystallization temperature of the crystalline olefinic polymer before the radical treatment being greater than or equal to 1, and (c) the proportion of the radical-treated crystalline olefinic polymer (b) being 0.2 to 100 parts by weight of the crystalline 1-butene polymer. The radical treatment purportedly may be carried out by treating the crystalline olefinic polymer in the molten state by the action of a shearing force in the presence of a crosslinking agent and a polymerization initiator, or exposing the crystalline olefinic polymer to light irradiation or ionizing irradiation in the presence of a photo-polymerization initiator.

Kirch, German Application DE 3,415,063, discloses a process for nucleation of partially crystalline plastics by irradiation wherein neutron beams are applied. Purportedly, the neutron beams, because of their different physical mode of action, as compared to electron, X-ray, gamma or ultraviolet beams, interact primarily with hydrogen atoms which reduces the number of chain breaks. Moreover, Kirch states that treatment with electron, X-ray, gamma or ultraviolet beams cause an undesired intensive degradation which alters the properties of the starting polymers. Kirch discloses neutron emitters such as americium-241/beryllium, californium-252, spent nuclear fuel rods and neutron radiation occurring in the operation of nuclear reactors as irradiation sources. These sources are, however, from a practical standpoint, difficult to effectively access and utilize due to numerous factors.

Fisher, U.S. Pat. No. 4,628,073 discloses a soft-rubbery matrix material, and a method of producing the material, wherein the material is composed of 0.3-70 micron particles of a 50,000-300,000 molecular weight cross-linkable polymer dispersed in a fluxable elastomer where the polymer's softening point temperature exceeds the elastomer's fluxing temperature and the polymer and elastomer are combined and mixed at a temperature maintained above the fluxing temperature of the elastomer but below the softening point temperature of the polymer. When a cross-linked polymer component is desired, high-energy ionizing radiation induced cross-linking is the preferred practice.

Potts, U.S. Pat. No. 3,349,018, discloses a method for controllably degrading alpha olefin polymers such as polypropylene without the use of heat and/or mechanical shear. In the method of Potts, polypropylene is degraded by subjecting it to ionizing radiation to a total dose of between about 0.01 to about 3 megareps but below that amount which causes gelation. The results of the method of Potts are attributed to uniform treatment of every portion of the resin mass by high energy ionizing radiation and it is stated that in the process each molecule of resin is surrounded by a cloud of high energy particles so that no portion of the polymer is able to escape treatment. Additionally, in a preferred embodiment of Potts, a small amount of antioxidant, preferably about 0.01 to about 0.1 percent by weight of anti-oxidant is incorporated prior to subjecting the polymer to ionizing irradiation.

Scheve, U.S. Pat. No. 4,916,198, discloses a purportedly normally solid, high molecular weight, gel-free, amorphous to predominantly crystalline, propylene polymer characterized by high melt strength due to strain hardening believed to be caused by free-end long chain branches of the molecular chains forming the polymer. The material is characterized by a branching index preferably less than 0.9 and most preferably about 0.2-0.4. Scheve also discloses a process for making the polymer by high energy radiation of a normally solid, high molecular weight, linear polypropylene polymer in a reduced oxygen environment, maintaining the irradiated material in such environment for a specific period of time, and then deactivating free radicals in the material.

There is, however, a need for a method of optimally enhancing the crystallization of polymers, such as polypropylene, polyethylene, propylene-ethylenecopolymers, and mixtures of the same. This modification should be readily achievable and practically feasible without the introduction of a foreign substance into the polymer and without degrading the polymers to any appreciable extent.

SUMMARY OF THE INVENTION

The present invention provides a polymer composition such as polypropylene, polyethylene, propylene-ethylene copolymer and mixtures of the same with enhanced crystallization properties. The polymer composition is prepared by selecting a base polymer, e.g., polypropylene, polyethylene or propylene-ethylene copolymer, mixing from about 500 ppm to about 3,000 ppm of an antioxidant with a first portion of the base polymer, treating, e.g., irradiating the first portion with from about 5 Mrad to about 30 Mrad of ionizing radiation in air to induce cross-linking in the first portion of the polymer, mixing the irradiated polymer with a second, non-irradiated portion of the base polymer to enhance crystallization of the polymer composition when it is melt processed. Preferably, from about 0.05% to about 1.25% of the polymer, including antioxidant, is treated with from about 10 Mrad to about 25 Mrad of ionizing radiation to induce cross linking of the treated portion of the polymer and mixed with the non-irradiated polymer. Most preferably, from about 0.1% to about 0.5% of the polymer, including antioxidant, is treated with about 10 to 20 Mrads of ionizing radiation and mixed with the non-irradiated base polymer. The irradiation step is conducted in air, thereby eliminating the need for a reduced oxygen atmosphere and associated equipment.

In the practice of the present invention, elevations in DSC (differential scanning calorimeter) freeze points evidence crystallization enhancement. Preferably, increases of at least 6° C. to 8° C. are observed so that $T_w - T_b \geq 6°$ C., where $T_w$ is the freeze point of the polymer composition and $T_b$ is the freeze point of the non-irradiated base polymer.

Thus, the irradiated cross linked portion of the polymer becomes a nucleating agent to enhance crystallization of the polymer composition during melt processing. Crystallization enhancement is accomplished by treating a small portion of a selected base polymer and without degrading the polymer composition to any appreciable extent compared to the base polymer such that the ratio $MFR_w/MFR_b$ is within a range of from about 0.8 to about 1.2 where $MFR_w$ is the melt flow rate of the polymer composition and $MFR_b$ is the melt flow rate of the non-irradiated base polymer.

Enhanced crystallization also allows increased production rates of products made from the polymer composition without the introduction of any foreign materials into the polymer.

DETAILED DESCRIPTION

The treatment of a polymer with sufficient ionizing radiation triggers a complex chain of events that leads to the generation of free radicals, polymer chain scissioning and cross-linking. The scissioning and cross-linking processes are believed to occur simultaneously and are generally a function of the polymer type, with one of the two processes normally predominating. In the case of polypropylene, when irradiation is carried out in air, the predominant process is chain scissioning rather than cross-linking. Chain scissioning has the effect of increasing the melt flow rate (MFR) as determined by ASTM method D1238, condition L. Cross-linking has the opposite effect, lowering the melt flow rate. The molecular weight distribution of the polymer indicates the relative degrees of chain scission and cross-linking. Thus, the ratios Mz/Mn and Mz/Mw are indicative of the relative amount of cross-linking where Mw is weight average molecular weight, Mn is number average molecular weight and Mz is z average molecular weight. Mz is sensitive to high molecular weight ends whereas Mw and Mn are sensitive to lower molecular weight ends. Mw, Mn and Mz are discussed at page 471 of *Fundamentals of Polymer Processing* (McGraw-Hill, Inc. 1977).

Ionizing radiation may consist of gamma rays or an electron beam. Ionizing radiation is measured in rads, and is normally expressed in megarads (Mrads) or millions of rads. Gamma rays may be provided from radioactive materials such as cobalt 60 and are highly penetrating but have a relatively slow process rate. Ionizing radiation may also be provided in the form of an electron beam from an electron beam accelerator which is normally characterized by the accelerator voltage and the electron beam current, or the number of electrons delivered per second. Electrons are less penetrating than gamma rays, but electron accelerators may have more capacity than gamma ray sources, up to several hundred kilowatts.

When polypropylene, polyethylene, propylene-ethylene copolymer or blends of the foregoing ar treated with sufficient ionizing radiation, free radicals are formed and chain scission occurs as chemical bonds are broken. The free radicals thus formed also lead to cross-linking of the polymers. It is believed that the cross-linked polymers serve as nuclei for the initiation of crystallization, thereby enhancing the crystallization of the polymer. One measure of the degree of crystallization enhancement is the increase in the freeze point of the polymer as measured with a differential scanning calorimeter (DSC). An increase in DSC freeze point reflects a decrease in the time required for the polymer to crystallize and solidify when the polymer is melt processed.

Chain scissioning of the polymer, however, degrades the polymer and as such, is normally undesirable. It was, however, discovered that if an optimal amount of antioxidant were added to the polymer prior to exposing the polymer to ionizing radiation, cross-linking was accomplished while chain scission was controlled at an acceptable level. It is believed that the antioxidant acts as a free radical sponge or a scavenger, thereby controlling the chain scissioning process. The addition of excessive amounts of antioxidants, however, inhibits cross-linking to an undesirable extent. Preferably, antioxidant is added to the polymer at a rate of from about 500 to about 3000 ppm. More preferably, from about 500 ppm to about 1,500 ppm of antioxidant is used to control chain scissioning. Variation above and below these limits may be possible depending upon the effectiveness of the particular anti-oxidant and the absorbed radiation dosage. Antioxidants suitable for use in connection with the practice of the present invention include substituted phenols, amines, alkyl, aryl, and mixed alkyl-aryl phosphites, alkyl, aryl, and mixed alkyl-aryl phosphonates, alkali or alkaline metal salts of phosphonates, thioesters, thio compounds containing oxidizable sulphur and aryl nitrosos compounds.

In the practice of the present invention, it is not necessary or desirable to treat all of the polymer to achieve the desired results. It is also not necessary or desirable to expose the portion of the polymer to be irradiated to ionizing radiation in a reduced oxygen atmosphere. In fact, crystallization enhancement is achieved by treating a relatively small portion, from about 0.01% to about 1.25% of the polymer with an antioxidant and exposing the polymer/antioxidant mixture to ionizing radiation in air to induce cross-linking. Preferably, cross-linking is induced to the extent that a least a portion of the irradiated polymer is gelled as determined by an increase in xylene insolubles compared to the non-irradiated base polymer.

It is contemplated that in the preparation of the polymer, a small side stream of the polymer, from about 0.01% to about 1.25% will be separated from the polymer stream, mixed with an antioxidant and exposed to ionizing radiation in air and then recombined with the non-irradiated polymer stream. Alternatively, a fraction, from about 0.01% to about 1.25% of a prepared polymer may be treated in a batch operation and recombined with the untreated polymer. In this manner, crystallization of the polymer may be enhanced rapidly, economically, and without the addition of any foreign substance to the polymer.

The invention will be further described with respect to the following examples; however, the scope of the invention is not to be limited thereby.

EXAMPLE 1

A polypropylene homopolymer commercially available from Rexene Products Company of Odessa, Tex., under the trade designation 41E4CS215 containing about 1000 ppm of a substituted phenol antioxidant commercially available from CIBA-GEIGY Corp., Plastics Division, of Hawthorne, N.Y. 10532 under the trade designation Irganox 1330 (4, 4', 4''-[(2, 4, 6-trimethyl-1, 3, 5-benzenetriyl) tris (methylene)] tris [2, 6-bis (1, 1 dimethylethyl) phenol]) was treated with 5 Mrads of gamma radiation. The radiation source used was Cobalt 60. The treated homopolymer was then tested for melt flow rate, extrudate swell, and its molecular weight distribution was determined by standard gel permeation chromatography using a Waters 150C unit with a Jordi mixed bed polydivinyl benzene column operating at 145° C. with 1, 2, 4 trichlorobenzene as the solvent. Polypropylene homopolymer available from Rexene Products Company under the trade designation 41E4CS215 was used as the primary standard. The treated homopolymer was then added to untreated homopolymer at rates of 0.1%, 0.25%, 0.5%, and 1%. The mixtures were heated to 225° C., stabilized at that temperature for five minutes, and then cooled at a rate of 10° C./min. and the freezing points of the polymers were determined using a Perkin Elmer Model DSC-2C differential scanning calorimeter (DSC). The same tests were performed on non-irradiated homopolymer and homopolymer without the addition of irradiated homopolymer as a control sample for the purpose of comparison. The results of the tests are set forth below in Tables I and II.

TABLE I

| Sample | Control | 5 MRADS |
| --- | --- | --- |
| MFR | 3.2 | 32.7 |
| Swell | 1.26 | 1.96 |
| Mw × $10^{-3}$ | 277 | 167 |
| Mn × $10^{-3}$ | 43 | 25 |
| D = Mw/Mn | 6.4 | 6.7 |
| Mz × $10^{-3}$ | 754 | 492 |
| Mz/Mw | 2.7 | 3.0 |
| Mz/Mn | 17.5 | 19.7 |

TABLE II

| DSC Freeze Points (°C.) (Control - 107.7) | |
| --- | --- |
| % Addition | Freeze Point |
| 0.10 | — |
| 0.25 | 116.9 |
| 0.50 | 117.4 |
| 1.00 | — |

EXAMPLE 2

The propylene homopolymer of Example 1 was treated in the same manner as Example 1, except the homopolymer was treated with 10 Mrads of gamma radiation. The results of the tests performed on the polypropylene homopolymer are set forth in Tables III and IV below.

EXAMPLE 3

The propylene homopolymer of Example 2 was treated in the same manner as set forth in Example 1, except the homopolymer Was treated with 15 Mrads of gamma radiation. The results of the tests performed on the polypropylene homopolymer are set forth in Tables III and IV below.

TABLE III

| Sample | Control | 10 MRADS | 15 MRADS |
|---|---|---|---|
| MFR | 3.3 | 103.9 | 25.7 |
| Swell | 1.25 | 2.38 | 3.58 |
| Mw × 10$^{-3}$ | 304 | 155 | 173 |
| Mn × 10$^{-3}$ | 49 | 27 | 28 |
| D = Mw/Mn | 6.2 | 5.7 | 6.2 |
| Mz × 10$^{-3}$ | 787 | 484 | 566 |
| Mz/Mw | 2.6 | 3.1 | 3.3 |
| Mz/Mn | 16.1 | 17.9 | 20.2 |

TABLE IV

| | DSC Freeze Points (°C.) (Control - 107.7) | |
|---|---|---|
| % Addition | 10 MRADS | 15 MRADS |
| 0.10 | — | 114.4 |
| 0.25 | 118.0 | 120.3 |
| 0.50 | 118.6 | 120.4 |
| 1.00 | — | 121.8 |

EXAMPLE 4

A propylene-ethylene random copolymer with about 2% ethylene commercially available from Rexene Products Company of Odessa, Tex., under the trade designation 23M2CS198 containing about 1,000 ppm Irganox 1330 and about 60 ppm calcium stearate was treated with 5 Mrads of gamma radiation and added to untreated copolymer at rates of 0.1%, 0.25%, 0.50% and 1%. The samples were tested in the same manner as Example I. The results are set forth below in Tables V and VI.

EXAMPLE 5

The copolymer of Example 4 was treated in the same manner as set forth in Example 4, except that the copolymer was treated with 10 Mrads of gamma radiation. The results of the tests performed on the copolymer are set forth in Tables V and VI below.

TABLE V

| Sample | Control | 5 MRADS | 10 MRADS |
|---|---|---|---|
| MFR | 2.1 | 35.2 | 49.9 |
| Swell | 1.25 | 2.16 | 2.72 |
| Mw × 10$^{-3}$ | 302 | 169 | 168 |
| Mn × 10$^{-3}$ | 45 | 36 | 32 |
| D = Mw/Mn | 6.7 | 4.7 | 5.3 |
| Mz × 10$^{-3}$ | 850 | 474 | 509 |
| Mz/Mw | 2.8 | 2.8 | 3.0 |
| Mz/Mn | 18.9 | 13.2 | 15.9 |

TABLE VI

| | DSC Freeze Points (°C.) (Control - 97.3) | |
|---|---|---|
| % Addition | 5 MRADS | 10 MRADS |
| 0.10 | — | — |
| 0.25 | 104.7 | 106.8 |
| 0.50 | 104.5 | 107.3 |
| 1.00 | — | — |

EXAMPLE 6

The copolymer of the foregoing example was treated with from about 5 to about 35 Mrads of gamma radiation in 5 Mrad increments and tested for xylene insoluble content by refluxing in boiling xylene for 12 hours. The irradiated polymer was then added to untreated copolymer at levels of 2,500 ppm and 5,000 ppm and tested for DSC freeze points. The test results are set forth in Table VII below.

TABLE VII

| | | DSC Freeze Points (°C.) (Control - 97.3) | |
|---|---|---|---|
| Dosage (MRADS) | Xylene Insoluble Content % | 2500 ppm | 5000 ppm |
| 0 | 0.0 | — | — |
| 5 | <0.1 | 104.7 | 104.5 |
| 10 | <0.1 | 106.8 | 107.3 |
| 15 | 34.3 | 108.1 | 108.4 |
| 25 | 35.8 | 104.3 | 106.2 |
| 35 | 41.9 | 103.3 | 104.3 |

The increase in xylene insoluble content for the polymer treated with 15, 25 and 35 Mrads of ionizing radiation indicates that substantial gelation and crosslinkings of the polymer occurs when the polymer is irradiated to a dosage greater than 10 Mrad. It is also noteworthy that the greatest increase in DSC freeze point resulted from the addition of the polymer treated with 15 Mrads of ionizing radiation and the magnitude of the increase in DSC freeze point unexpectedly declined when the polymer treated with 25 and 35 Mrads of ionizing radiation was mixed with the base polymer. Thus, in order to obtain the desired increase in DSC freeze point, the xylene insoluble content of the irradiated polymer, which reflects the extent of cross-linking and gelation, is advantageously at an optimum level. It should also be noted that above 10 Mrad dosage the amount of xylene insoluble content is significant and the results of solutional analysis, e.g. gel permeation chromatography, performed on such materials and set forth in the Examples may be affected due to the fact that some of the irradiated material will not go into solution.

EXAMPLE 7

Propylene-ethylene random copolymer with about 2% ethylene commercially available from Rexene Products Company under the trade designation 23M2CS198 containing about 1,000 ppm Irganox 1330 and about 60 ppm calcium stearate was treated with 15 Mrads of gamma radiation. A separate sample was treated with 15 Mrads of electron beam radiation produced by a 12 MeV (million electron volt) electron beam linear accelerator. The treated copolymer was then added to untreated copolymer at rates of 0.1%, 0.25%, 0.5%, 1.0% and 1.25%. The samples were tested as in Example 1, and the test results are set forth in Tables VIII and IX.

TABLE VIII

| Sample | Control | Electron Beam 15 MRADS | Gamma 15 MRADS |
|---|---|---|---|
| MFR | 2.3 | 13.6 | 21.0 |
| Swell | 1.25 | 2.97 | 4.23 |
| $Mw \times 10^{-3}$ | 274 | 164 | 153 |
| $Mn \times 10^{-3}$ | 44 | 26 | 23 |
| $D = Mw/Mn$ | 6.2 | 6.3 | 6.7 |
| $Mz \times 10^{-3}$ | 757 | 530 | 556 |
| Mz/Mw | 2.8 | 3.2 | 3.6 |
| Mz/Mn | 17.2 | 20.4 | 24.2 |

TABLE IX

DSC Freeze Points (°C.)
(Control - 100.4)

| % Addition | Electron Beam 15 Mrads | Gamma 15 Mrads |
|---|---|---|
| 0.10 | 108.4 | 106.5 |
| 0.25 | 108.9 | 108.1 |
| 0.50 | 109.8 | 108.4 |
| 1.00 | 110.6 | 110.1 |
| 1.25 | 111.8 | 110.8 |

EXAMPLE 8

Propylene-ethylene random copolymer with about 2% ethylene commercially available from Rexene Products Company of Odessa, Tex., under the trade designation 23M2CS38 containing about 1,200 ppm of 2, 6-di-tert-butyl-para-cresol (BHT) and about 1,000 ppm of calcium stearate was treated with 15 Mrads of gamma radiation. A separate sample of the same material was treated with 15 Mrads of electron beam radiation. The treated copolymer was then added to untreated copolymer at rates of 0.1%, 0.25%, 0.50%, 1.0% and 1.25% and the samples were tested as in Example 1. The results are set forth in Tables X and XI.

TABLE X

| Sample | Control | Electron Beam 15 MRADS | Gamma 15 MRADS |
|---|---|---|---|
| MFR | 2.1 | 5.5 | 3.5 |
| Swell | 1.28 | 2.55 | 3.82 |
| $Mw \times 10^{-3}$ | 307 | 145 | 132 |
| $Mn \times 10^{-3}$ | 47 | 23 | 20 |
| $D = Mw/Mn$ | 6.5 | 6.3 | 6.6 |
| $Mz \times 10^{-3}$ | 840 | 504 | 494 |
| Mz/Mw | 2.7 | 3.5 | 3.7 |
| Mz/Mn | 17.9 | 21.9 | 24.7 |

TABLE XI

DSC Freeze Points (°C.)
(Control - 100)

| % Addition | Electron Beam 15 Mrads | Gamma 15 Mrads |
|---|---|---|
| 0.10 | 107.1 | 108.0 |
| 0.25 | 108.7 | 109.3 |
| 0.50 | 109.2 | 110.0 |
| 1.00 | 110.5 | 111.4 |
| 1.25 | 111.9 | 111.9 |

EXAMPLE 9

Propylene-ethylene random copolymer, with about 6% ethylene was produced in a pilot plant test. The copolymer was stabilized with about 1,500 ppm of a mixture of 50% by weight Irganox 1010 (2,2-bis [[3-[3,5-bis(1,1 dimethylethyl)-4-hydroxyphenyl]-1-oxopropoxy]methyl]-1,3-propanoate propanediyl 3,5-bis(1,1-dimethylethyl)-4-hydroxybenzene) and 50% Irgafos 168 (2,4-bis(1,1-dimethylethyl) phenyl-phosphite (3:1)). The copolymer also contained about 250 ppm of a synthetic dihydro talcite and about 100 ppm calcium stearate. Irganox 1010 and Irgafos 168 are commercially available from CIBA-GEIGY and the synthetic dihydro talcite is available from Mitsui Chemical Co. of Houston, Tex. under the trade designation DHT4A. Samples of the copolymer were treated with 15 Mrads of gamma radiation and the treated copolymer was added to untreated propylene-ethylene random copolymer commercially available from Rexene Products Company under the trade designation 23M2CS198 at rates of 0.10%, 0.25%, 0.50% and 1%. Samples of the mixtures were tested as in Example 1 and the test results are set forth in Tables XII and XIII below.

TABLE XII

| Sample | Control | 15 MRADS |
|---|---|---|
| MFR | 0.1 | 5.7 |
| Swell | 1.12 | — |
| $Mw \times 10^{-3}$ | 564 | 171 |
| $Mn \times 10^{-3}$ | 74 | 36 |
| $D = Mw/Mn$ | 7.6 | 4.8 |
| $Mz \times 10^{-3}$ | 1131 | 536 |
| Mz/Mw | 2.0 | 3.1 |
| Mz/Mn | 15.3 | 14.9 |

TABLE XIII

DSC Freeze Points (°C.)
(Control - 97.3)

| % Addition | (15 MRADS) |
|---|---|
| 0.10 | — |
| 0.25 | 104.4 |
| 0.50 | 104.8 |
| 1.00 | — |

EXAMPLE 10

Propylene-ethylene random copolymer produced by Rexene Products Company under the designation 23A2 containing about 2% ethylene without antioxidants was treated with 2.5 Mrads of gamma radiation to study the effect of antioxidants. Separate samples were treated with Mrads and 15 Mrads. The treated copolymer was added to untreated propylene-ethylene random copolymer commercially available from Rexene Products Company under the trade designation 23M2CS198 at rates of 0.1%, 0.25%, 0.5% and 1.0% and the mixtures were tested as in Example 1. The test results are set forth in Tables XIV and XV below.

TABLE XIV

| Sample | Control | 2.5 MRADS | 5 MRADS | 15 MRADS |
|---|---|---|---|---|
| MFR | 2.3 | 47.5 | 59.0 | >200 |
| $Mw \times 10^{-3}$ | 293 | 146 | 149 | 31 |
| $Mn \times 10^{-3}$ | 45 | 35 | 30 | 10 |
| $D = Mw/Mn$ | 6.5 | 4.2 | 5.0 | 3.1 |
| $Mz \times 10^{-3}$ | 827 | 378 | 441 | — |
| Mz/Mw | 2.8 | 2.6 | 3.0 | — |
| Mz/Mn | 18.4 | 10.8 | 14.7 | — |

TABLE XV

DSC Freeze Points (°C.)
(Control - 97.3)

| % Addition | (2.5 MRADS) | (5 MRADS) | (15 MRADS) |
|---|---|---|---|
| 0.10 | — | — | 98.1 |
| 0.25 | 102.6 | 101.5 | 98.5 |
| 0.50 | 102.5 | 102.0 | 97.5 |

TABLE XV-continued

| | DSC Freeze Points (°C.) (Control - 97.3) | | |
|---|---|---|---|
| % Addition | (2.5 MRADS) | (5 MRADS) | (15 MRADS) |
| 1.00 | — | — | 98.6 |

The foregoing example illustrates that without the addition of antioxidant to the irradiated polymer prior to irradiation, the desired increase in DSC freeze point is not achieved.

EXAMPLE 11

Samples of a propylene-ethylene impact copolymer commercially available from Rexene Products Company under the trade designation 14SIA containing about 500 ppm calcium stearate was mixed with Irganox 1330, Irgafos 168 and BHT at different levels and treated with 15 Mrads of gamma radiation. The samples were tested for melt flow rate (MFR) and molecular weight distribution. The test results are set forth in Tables XVI and XVII.

TABLE XVI

| Sample | Antioxidant | MFR |
|---|---|---|
| Untreated Control | 1000 ppm Irganox 1330 | 1.7 |
| 1 | 1000 ppm Irganox 1330 | 67.0 |
| 2 | 1000 ppm BHT | 70.8 |
| 3 | 2500 ppm Irganox 1330 | 415.0 |
| 4 | 2500 ppm BHT | 259.2 |
| 5 | 1000 ppm Irganox 1330 + 1000 ppm BHT | 283.0 |
| 6 | 2000 ppm Irganox 1330 + 2000 ppm BHT | 290.2 |
| 7 | 1000 ppm Irgafos 168 + 1000 ppm BHT | 289.2 |

TABLE XVII

| Sample | Mw × 10⁻³ | Mn × 10⁻³ | Mz × 10⁻³ | D = Mw/Mn | Mz/Mn |
|---|---|---|---|---|---|
| Untreated Control | 289 | 48 | 789 | 6.0 | 16.4 |
| 1 | 158 | 31 | 502 | 5.1 | 16.2 |
| 2 | 150 | 32 | 481 | 4.7 | 15.0 |
| 3 | 123 | 30 | 394 | 4.1 | 13.1 |
| 4 | 143 | 34 | 443 | 4.2 | 13.0 |
| 5 | 133 | 32 | 406 | 4.2 | 12.7 |
| 6 | 136 | 33 | 409 | 4.1 | 12.4 |
| 7 | 133 | 32 | 407 | 4.2 | 12.7 |

The foregoing example illustrates that the addition of excessive amounts of antioxidant, based upon the specific radiation dosage level, inhibits cross-linking as evidenced by the markedly increased melt flow rate of the samples containing higher levels of antioxidant.

EXAMPLE 12

A polyolefin blend composed of 75% by weight of a propylene-ethylene random copolymer with about 2% ethylene containing about 1,200 ppm BHT and about 1,000 ppm calcium stearate was mixed with 25% by weight of a polyethylene homopolymer and treated with 15 Mrads of gamma radiation. A separate sample of the polyolefin blend was treated with 15 Mrads of electron beam radiation. The propylene-ethylene random copolymer and the polyethylene homopolymer are commercially available from Rexene Products Company under the trade designations 23M2CS38 and PE 6010. The treated polyolefin blend was then added to an untreated propylene-ethylene copolymer commercially available from Rexene Products Company under the trade designation 23M2CS38. The DSC freeze points of the mixtures were determined and the results are set forth in Table XVIII.

TABLE XVIII

| | DSC Freeze Points (°C.) (Control - 100.0) | |
|---|---|---|
| % Addition | Electron Beam 15 Mrads | Gamma 15 Mrads |
| 0.10 | 108.8 | 108.7 |
| 0.25 | 110.9 | 109.7 |
| 0.50 | 108.8 | 110.5 |
| 1.00 | 111.2 | 111.6 |
| 1.25 | 112.1 | 111.8 |

EXAMPLE 13

Samples of propylene-ethylene random copolymer with about 2% ethylene commercially available from Rexene Products Company of Odessa, Tex., under the trade designation 23M2CS198 containing about 1,000 ppm Irganox 1330 and about 60 ppm calcium stearate was treated with 15 Mrads of gamma radiation. A separate sample was treated with 15 Mrads of electron beam radiation. The treated copolymer was then added to untreated copolymer (23M2CS198) at rates of 0.25%, 0.50% and 1.0%. The hexane and xylene extractability of the copolymer was determined according to the FDA test procedure set forth in 21 CFR 177.1520(d) and the results are set forth in Table XIX.

TABLE XIX

| | FDA Extractability Tests (wt %) (Control: Hexane - 2.3 and Xylene - 5.3) | | | |
|---|---|---|---|---|
| | Gamma Radiation | | Electron Beam | |
| % Addition | Hexane | Xylene | Hexane | Xylene |
| 0.25 | 2.4 | 5.3 | 2.2 | 5.0 |
| 0.50 | 2.4 | 5.1 | 2.2 | 5.1 |
| 1.00 | 2.4 | 5.2 | 2.2 | 4.8 |

EXAMPLE 14

Propylene-ethylene random copolymer with about 2% ethylene (23M2CS38) containing about 1,200 ppm of 2,6- di-tert-butyl-para-cresol (BHT) and about 1,000 ppm calcium stearate and having a nominal melt flow rate of 2.0 was irradiated to a dosage of 15 Mrads with electron beam radiation. The irradiated polymer was added to nonirradiated polymer (23M2CS38) at rates of 0.1%, 0.25%, 0.50%, 1.00% and 1.25% and the blended polymers were tested for melt flow rate. The melt flow rates of the blended polymers are set forth in table XX below.

TABLE XX

| % Addition | MFR |
|---|---|
| 0.0% | 2.2 |
| 0.1% | 2.1 |
| 0.25% | 2.2 |
| 0.50% | 2.1 |
| 1.00% | 2.1 |
| 1.25% | 2.2 |

EXAMPLE 15

Propylene-ethylene random copolymer with about 2% ethylene (23M2CS198) containing about 1,000 ppm Irganox 1330 and about 60 ppm calcium stearate and having a nominal melt flow rate of 2.0 were irradiated to a dosage of 15 Mrads with electron beam radiation. The irradiated polymer was added to non-irradiated polymer (23M2CS198) at rates of ) 0.10%, 0.25%, 0.50%, 1.00% and 1.25% and the blended polymers were tested for melt flow rate. The melt flow rates of the blended polymers are set forth in Table XXI below.

TABLE XXI

| % Addition | MFR |
|---|---|
| 0.0% | 2.0 |
| 0.1% | 1.9 |
| 0.25% | 2.0 |
| 0.50% | 1.9 |
| 1.00% | 1.9 |
| 1.25% | 1.9 |

The foregoing examples illustrate that a small portion of polypropylene, polyethylene, or propylene-ethylene copolymer and mixtures of the same, mixed with an optimal amount of antioxidant, and exposed to ionizing radiation in air will enhance the crystallization of a much larger portion of non-irradiated bas polymer without degrading the whole polymer to any appreciable extent. The foregoing examples also illustrate that radiation dosage and antioxidant levels are optimized to provide a sufficient amount of cross-linked polymer, as evidenced by the concentration of xylene insolubles, to provide the optimal increase in DSC freeze point when the irradiated polymer is mixed with the base polymer. Moreover, crystallization efficiency of the whole polymer is enhanced without affecting the extractability of the polymer and without degrading the whole polymer to an appreciable extent.

While particular embodiments of the present invention have been illustrated and described, it will be apparent to those skilled in the art that various changes and modifications may be made without departing from the spirit and scope of the invention.

We claim:

1. A polymer composition comprising:
   from 0.1 to 1.25 wt % of a substantially gelled first polymer selected from the group consisting of polypropylene, polyethylene, propylene-ethylene copolymers and mixtures thereof, including from 500 to 3000 ppm antioxidant, said first polymer being irradiated in air with from 10 to 25 Mrads of ionizing gamma or electron beam radiation and containing at least 30 wt. % xylene insolubles;
   from 98.75 to 99.9 wt % of a non-irradiated second polymer selected from the group consisting of polypropylene, polyethylene, propylene-ethylene copolymers and mixtures thereof,
   said composition having a freeze point such that $T_w - T_b \geq 6°$ C. where $T_w$ is the freeze point of the polymer composition and $T_b$ is the freeze point of the non-irradiated second portion,
   said polymer composition being substantially non-degraded as compared to the second non-irradiated portion such that the ratio $MFR_w/MFR_b$ is within a range of from 0.8 to 1.2 where $MFR_w$ is the melt flow rate of the polymer composition and $MFR_b$ is the melt flow rate of the non-irradiated second portion.

2. The polymer composition of claim 1 wherein the antioxidant is selected from the group consisting of substituted phenols, amines, phosphites, thioesters, thio compounds containing oxidizable sulphur, phosphonates, aryl nitroso compounds and mixtures thereof.

3. The polymer composition of claim 1 wherein the first and second polymers are selected from the group consisting of propylene homopolymers, ethylene homopolymers, propylene-ethylene copolymers and mixtures thereof.

4. The polymer composition of claim 2 wherein said first polymer of said composition is irradiated with dosage of about 15 Mrads.

5. The polymer composition of claim 1 wherein the antioxidant is selected from the group consisting of: 4, 4′, 4″- [(2, 4, 6-trimethyl-1, 3, 5-benzenetriyl) tris (methylene)] tris [2, 6-bis (1, 1 dimethylethyl) phenol], 2, 6-di-tert-butyl-para-cresol, (2,2-bis [[3 3, 5-bis (1, 1 dimethylethyl)-4-hydroxyphenyl]-1-oxopropoxy]methyl]-1,3-propanoate propanediyl 3,5-bis(1,1-dimethylethyl)-4-hydroxybenzene) and (2,4-bis(1,1-dimethylethyl) phenylphosphite and mixtures thereof.

6. A process for the production of a polymer composition having enhanced crystallization properties comprising the steps of:
   (a) irradiating in air a first polymer selected from the group consisting of polypropylene, polyethylene, propylene-ethylene copolymers and mixtures thereof, including from 500 to 3000 ppm antioxidant, to a dosage of from 10 to 25 Mrads of ionizing gamma or electron beam radiation to produce a substantially gelled irradiated polymer containing at least 30 wt. % xylene insolubles; and
   (b) blending from 98.75 to 99.9 wt % of a non-irradiated second polymer selected from the group consisting of polypropylene, polyethylene, propyleneethylene copolymers and mixtures thereof with from about 0.1 to about 1.25 wt % of the irradiated first polymer to form a polymer composition having a freeze point such that $T_w - T_b \geq 6°$ C. where $T_w$ is the freeze point of the polymer composition and $T_b$ is the freeze point of the non-irradiated second polymer;
   said polymer composition being substantially non-degraded as compared to the second non-irradiated portion such that the ratio $MFR_w/MFR_b$ is within a range of from 0.8 to 1.2 where $MFR_w$ is the melt flow rate of the polymer composition and $MFR_b$ is the melt flow rate of the non-irradiated second portion.

7. The process of claim 6 wherein the antioxidant is selected from the group consisting of substituted phenols, amines, phosphites, thioesters, thio compounds containing oxidazable sulfur, phosphonates, aryl nitroso compounds and mixtures thereof.

8. The process of claim 6 wherein the first and second polymers are selected from the group consisting of propylene homopolymers, ethylene homopolymers, propyleneethylene copolymers and mixtures thereof.

9. The process of claim 6 wherein the first polymer is irradiated with a dosage of about 15 Mrads.

10. The process of claim 6 wherein the antioxidant is selected from the group consisting of:
4, 4″, 4″-[(2, 4, 6-trimethyl-1, 3, 5-benzenetriyl) tris (methylene)] tris [2, 6-bis (1, 1 dimethylethyl) phenol], 2, 6-di-tert-butyl-para-cresol, (2, 2-bis [[3, 3, 5-bis (1,1 dimethylethyl)-4-hydroxyphenyl]-1-oxopropoxy] methyl]-1, 3-propanoate propanediyl 3, 5-bis(1, 1-dimethylethyl)-4-hydroxybenzene) and (2, 2-bis(1, 1-dimethylethyl) phenyl-phosphite and mixtures thereof.

* * * * *

UNITED STATES PATENT AND TRADEMARK OFFICE
CERTIFICATE OF CORRECTION

PATENT NO. : 5,266,607

DATED : November 30, 1993

INVENTOR(S) : Bennie M. Lucas, V. Krishnamurthy

It is certified that error appears in the above-identified patent and that said Letters Patent is hereby corrected as shown below:

Column 8, line 34, change "crosslinkings" to --cross-linkings--.
Column 3, line 51, change "propylene-ethylenecopolymers" to --propylene-ethylene copolymers--.
Column 4, line 21, change "Tb$\geq$6°C" to Tb$\geq$6 C--.
Column 5, line 12, change "ar treated" to --are treated--.
Column 5, line 49, change "nitrosos" to --nitroso--.
Column 7, line 9, change "Was" to --was--.
Column 10, line 44, change "with Mrads" to --with 5 Mrads--.
Column 11, line 16, change "14SIA" to --14S1A--.
Column 12, line 47, change "nonirradiated" to --non-irradiated--.
Column 13, line 53, change "Tb$\geq$ 6°C" to --Tb$\geq$ 6°C--.
Column 13, line 21, change "bas" to --base--.
Column 14, line 32, change "propyleneethylene" to --propylene-ethylene--.
Column 14, line 36, change "Tb$\geq$ 6°C" to --TB$\geq$ 6°C--.
Column 14, line 54, change "propyleneethylene" to --propylene-ethylene--.

Signed and Sealed this

Twenty-eight Day of March, 1995

BRUCE LEHMAN

Attest:

Attesting Officer

Commissioner of Patents and Trademarks